(12) United States Patent
Chung et al.

(10) Patent No.: US 10,138,963 B2
(45) Date of Patent: Nov. 27, 2018

(54) SOLID-TYPE BRAKE DISC AND METHOD OF MANUFACTURING THE SAME

(71) Applicants: Hyundai Motor Company, Seoul (KR); Hyundai Sungwoo Casting Co., Ltd., Seoul (KR)

(72) Inventors: Min Gyun Chung, Whasung-Si (KR); Jai Min Han, Whasung-Si (KR); Yoon Cheol Kim, Whasung-Si (KR); Byung Chan Lee, Whasung-Si (KR); Yoon Joo Rhee, Whasung-Si (KR); Jae Young Lee, Whasung-Si (KR); In Seop Kim, Whasung-Si (KR); Jeong Ho Shin, Whasung-Si (KR)

(73) Assignees: Hyundai Motor Company, Seoul (KR); Hyundai Sungwoo Casting Co., Ltd., Seoul (KR)

( * ) Notice: Subject to any disclaimer, the term of this patent is extended or adjusted under 35 U.S.C. 154(b) by 0 days.

(21) Appl. No.: 15/372,903

(22) Filed: Dec. 8, 2016

(65) Prior Publication Data

US 2018/0080514 A1 Mar. 22, 2018

(30) Foreign Application Priority Data

Sep. 22, 2016 (KR) .......................... 10-2016-0121432

(51) Int. Cl.
*F16D 65/12* (2006.01)
*B22D 19/00* (2006.01)
(Continued)

(52) U.S. Cl.
CPC .......... *F16D 65/123* (2013.01); *B22D 19/00* (2013.01); *F16D 65/0006* (2013.01);
(Continued)

(58) Field of Classification Search
CPC ................. F16D 65/123; F16D 65/125; F16D 2065/1344; F16D 2065/1356; F16D 2065/1376
(Continued)

(56) References Cited

U.S. PATENT DOCUMENTS 5,823,303 A * 10/1998 Schwarz ............... F16D 65/123
188/218 XL
6,035,978 A * 3/2000 Metzen ................. F16D 65/123
188/218 XL
(Continued)

FOREIGN PATENT DOCUMENTS

JP 5393876 B2 1/2014
KR 10-1355613 B1 1/2014
(Continued)

*Primary Examiner* — Thomas J Williams
(74) *Attorney, Agent, or Firm* — Morgan, Lewis & Bockius LLP

(57) ABSTRACT

Disclosed is a solid-type brake disc including a hat part, which includes a circular main body mounted on a rotation shaft of a wheel, and a plurality of protrusions protruding in a circumferential direction from an outside surface of the main body, and a friction part, which includes a ring body having a through-hole formed in the center thereof for receiving the hat part in the through-hole, and recessed portions protruding from the periphery of the through-hole toward the respective protrusions, the recessed portions being connected to the respective protrusions to enclose the protrusions.

10 Claims, 13 Drawing Sheets

(51) Int. Cl.
*F16D 65/00* (2006.01)
*F16D 65/02* (2006.01)

(52) U.S. Cl.
CPC .... *F16D 65/125* (2013.01); *F16D 2065/1316* (2013.01); *F16D 2065/1344* (2013.01); *F16D 2065/1376* (2013.01); *F16D 2065/1384* (2013.01); *F16D 2200/0013* (2013.01)

(58) Field of Classification Search
USPC .................................................. 188/218 XL
See application file for complete search history.

(56) References Cited

U.S. PATENT DOCUMENTS

| | | | | |
|---|---|---|---|---|
| 6,321,885 B1* | 11/2001 | Wendt | ................... | B22D 19/16 |
| | | | | 188/218 XL |
| 6,523,651 B2* | 2/2003 | Schaus | ................... | F16D 65/12 |
| | | | | 188/218 XL |
| 2006/0213732 A1* | 9/2006 | Leevy | ................... | F16D 65/12 |
| | | | | 188/218 XL |
| 2011/0061980 A1* | 3/2011 | Anderson | ................ | B22C 9/10 |
| | | | | 188/218 XL |
| 2011/0259682 A1* | 10/2011 | Mueller | ................ | F16D 65/123 |
| | | | | 188/218 XL |
| 2011/0290602 A1* | 12/2011 | Kleber | ................... | B22D 19/00 |
| | | | | 188/218 XL |
| 2014/0041974 A1* | 2/2014 | Kim | ..................... | F16D 65/123 |
| | | | | 188/218 XL |
| 2014/0326551 A1* | 11/2014 | Anderson | ................ | F16D 65/12 |
| | | | | 188/218 XL |
| 2018/0142745 A1* | 5/2018 | Chung | ................... | F16D 65/123 |

FOREIGN PATENT DOCUMENTS

| | | |
|---|---|---|
| KR | 10-2014-0084734 A | 7/2014 |
| KR | 10-2015-0061665 A | 6/2015 |
| KR | 10-1526585 B1 | 6/2015 |

* cited by examiner

100(110,120)
200(210,220)

SOLID-TYPE BRAKE DISC AND METHOD OF MANUFACTURING THE SAME

CROSS-REFERENCE TO RELATED APPLICATION

The present application claims priority to Korean Patent Application No. 10-2016-0121432, filed on Sep. 22, 2016, the entire contents of which is incorporated herein for all purposes by this reference.

BACKGROUND OF THE INVENTION

Field of the Invention

Various embodiments of the present invention relates to a solid-type brake disc in which a hat part and a friction part are configured separately and realize strong coupling therebetween via a bridge that forms a connection structure therebetween.

Description of Related Art

In the case of a conventional solid-type brake disc, a hat part and a friction part are integrated to form a single body, whereby thermal and torque loads are applied to a rear wheel, which is smaller than a front wheel. There is also a dimensional limitation due to the properties of such an integrated configuration.

Therefore, the disclosure introduces a sold-type brake disc, which may achieve a thinner and lighter configuration and overcome a dimensional limitation, unlike the prior art, owing to a firm coupling structure between a hat part and a friction part.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a solid-type brake disc in which a hat part and a friction part are configured separately and realize strong coupling therebetween via a bridge that forms a connection structure therebetween.

In accordance with one aspect of the present invention, the above and other objects can be accomplished by the provision of a solid-type brake disc including a hat part including a circular main body mounted on a rotation shaft of a wheel, and a plurality of protrusions protruding in a circumferential direction from an outside surface of the main body, and a friction part including a ring body having a through-hole formed in a center thereof for receiving the hat part in the through-hole, and recessed portions protruding from a periphery of the through-hole toward the respective protrusions, the recessed portions being connected to the respective protrusions to enclose the protrusions.

Each of the recessed portions may have an end portion in contact with the outside surface of the main body, and may be provided with an inside space for enclosing a corresponding one of the protrusions.

Each of the protrusions may be divided into a first protruding body, which protrudes from the outside surface of the main body and is shaped to be gradually reduced in thickness with decreasing distance to an end portion thereof in an axial direction, and a second protruding body, which extends outward from the first protruding body and is shaped to be gradually increased in thickness with decreasing distance to an end portion thereof, such that the protrusion is thinnest at a boundary between the first protruding body and the second protruding body.

Each of the protrusions may be shaped to be gradually reduced in width with decreasing distance to an end portion thereof.

A ratio of a length that each protrusion protrudes from the outside surface of the main body in a radial direction to a length from an end portion of each recessed portion to an outer periphery of the ring body may range from 0.18 to 0.28.

A ratio of a thickness at the boundary between the first protruding body and the second protruding body to a thickness of the ring body may range from 0.35 to 0.40.

The second protruding body may have upper and lower slopes in the axial direction, and may be formed to be tilted upward and downward by an angle of 1.5 to 2 degrees relative to imaginary lines that extend in parallel to a radial direction at an upper end portion and a lower end portion of the boundary between the first protruding body and the second protruding body.

The protrusions and the recessed portions may form a plurality of bridges, which are spaced apart from one another by the same distance along the outside surface of the main body and the periphery of the through-hole to form discharge holes between the bridges.

The number of bridges may be nine.

In accordance with another aspect of the present invention, there is provided a method of manufacturing a solid-type brake disc, the method including cast-molding a hat part, which includes a circular main body mounted on a rotation shaft of a wheel and a plurality of protrusions protruding from an outside surface of the main body in a circumferential direction, inserting the hat part into a mold, and cast-molding a friction part, which includes a ring body having a through-hole in a center thereof for receiving the hat part in the through-hole and recessed portions protruding from a periphery of the through-hole toward the respective protrusions, the recessed portions being connected to the respective protrusions to enclose the protrusions, via casting.

In the cast-molding the hat part and the cast-molding the friction part, cast iron may be used to cast the hat part and the friction part, and a strength of the cast iron used to cast the hat part may be higher than a strength of the cast iron used to cast the friction part.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
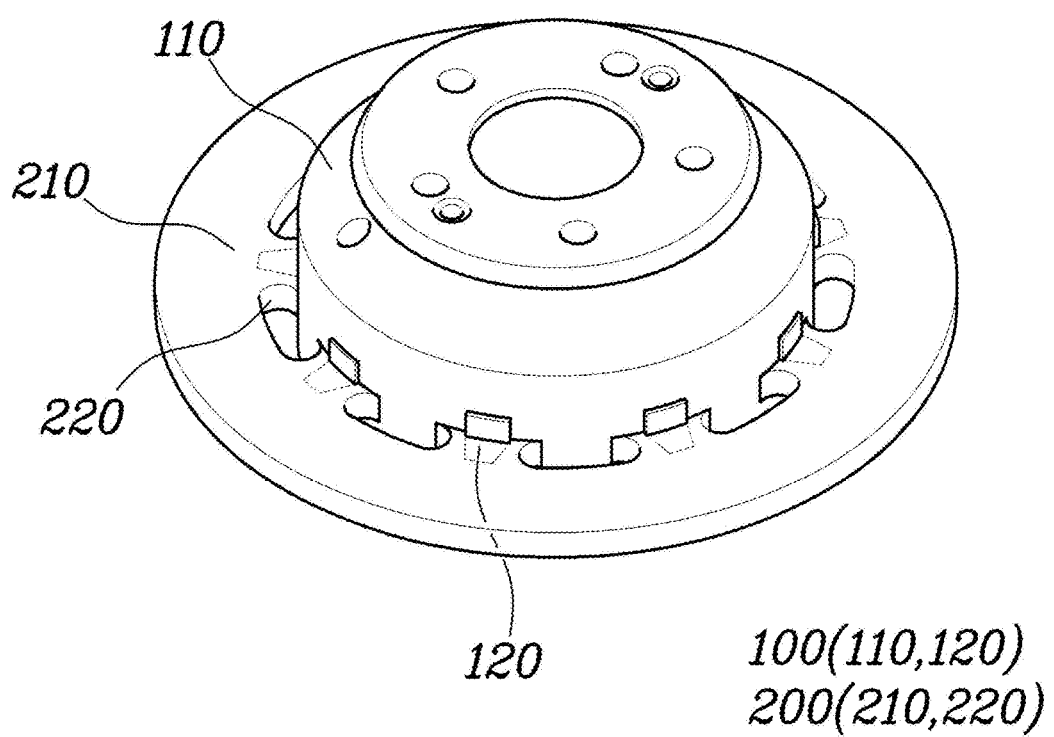
FIG. 1 is a view illustrating a solid-type brake disc an exemplary embodiment according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings.

Figure 2:
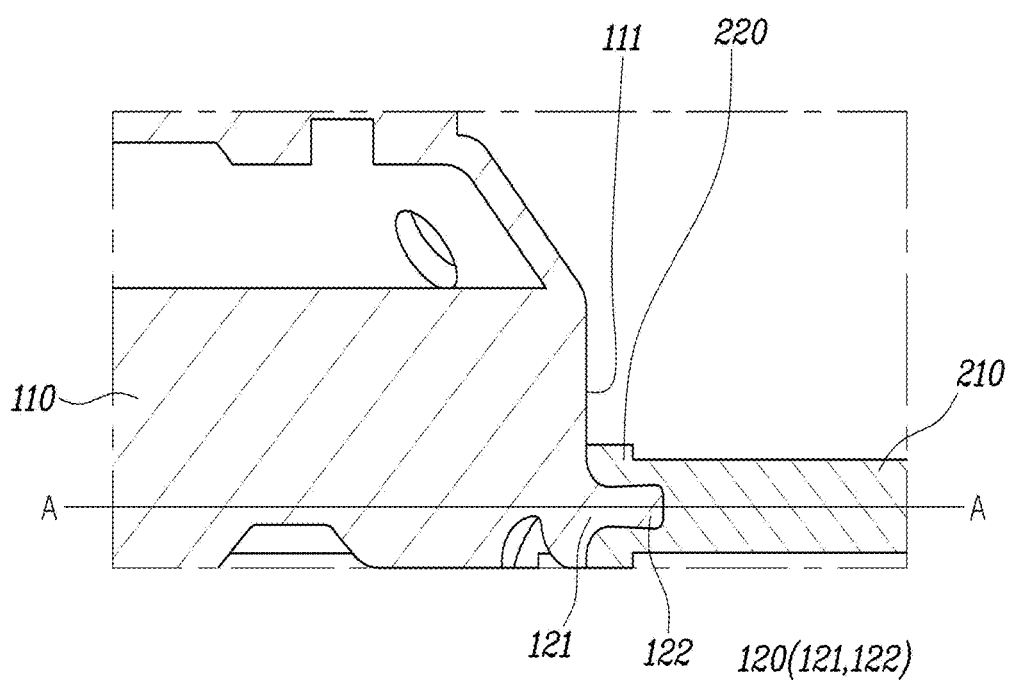
FIG. 2 is a view illustrating the cross section of the solid-type brake disc according to the exemplary embodiment of the present invention.
Figure 3:
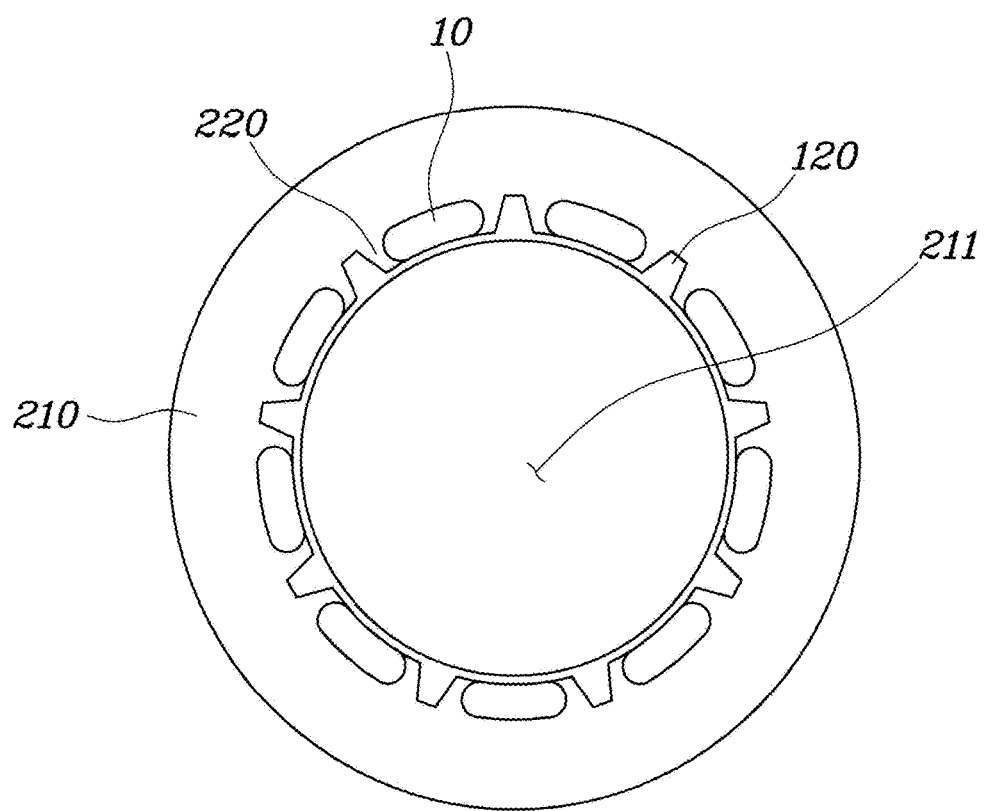
FIG. 3 is a sectional view taken along line A-A of FIG. 2 according to the exemplary embodiment of the present invention.

Referring to FIG. 1, FIG. 2, and FIG. 3, the solid-type brake disc according to an exemplary embodiment of the present invention includes a hat part 100, which includes a circular main body 110 mounted on a rotation shaft of a wheel and a plurality of protrusions 120 protruding in a circumferential direction from an outside surface 111 of the main body 110, and a friction part 200, which includes a ring body 210 having a through-hole 211 formed in the center thereof for receiving the hat part 100 in the through-hole 211, and recessed portions 220 protruding from the periphery of the through-hole 211 toward the protrusions 120, the recessed portions 220 being connected to the protrusions 120 to enclose the respective protrusions 120.

Figure 4:
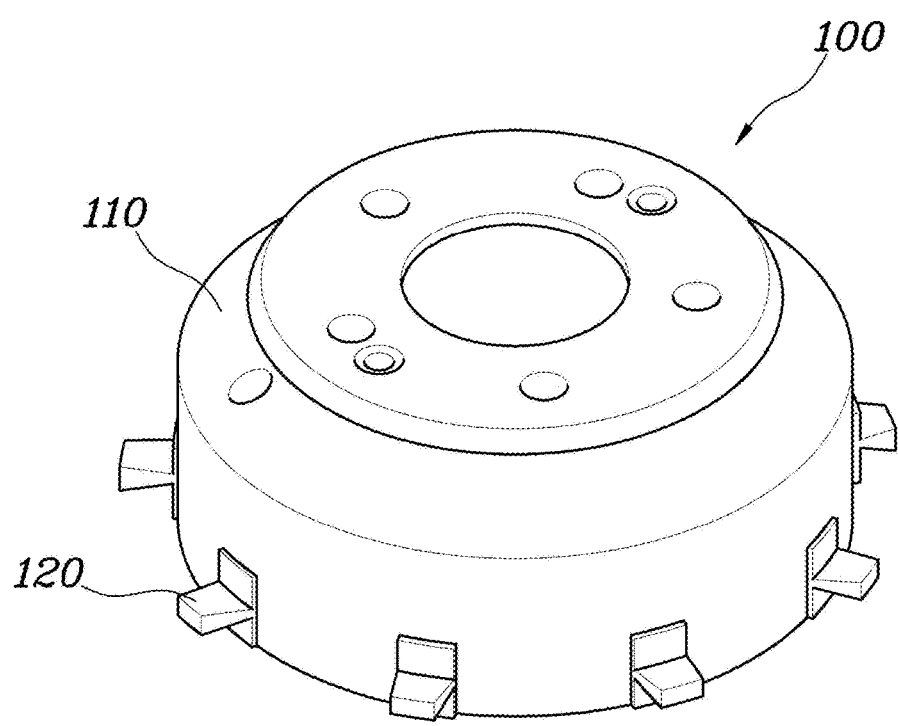
FIG. 4 is a view illustrating a hat part according to the exemplary embodiment of the present invention.

The hat part 100 is mounted on the rotation shaft of the wheel to be connected to a vehicle chassis. Referring to FIG. 4, the main body 110 of the hat part 100 has a circular shape and is provided with the outside surface 111 that forms the circumferential surface of the circular main body 110. The protrusions 120 protrude from the outside surface 111 in the circumferential direction. The protrusions 120 of the hat part 100 are the portions that are to be coupled to the friction part 200, which will be described below. The protrusions 120 may be spaced apart from each other at regular intervals.

The hat part 100 may be formed of spheroidal graphite cast iron having high strength, and may achieve a thinner and lighter configuration than the prior art because some portions thereof may be slimmed. In addition, the hat part 100 may realize a parking function.

Figure 5:
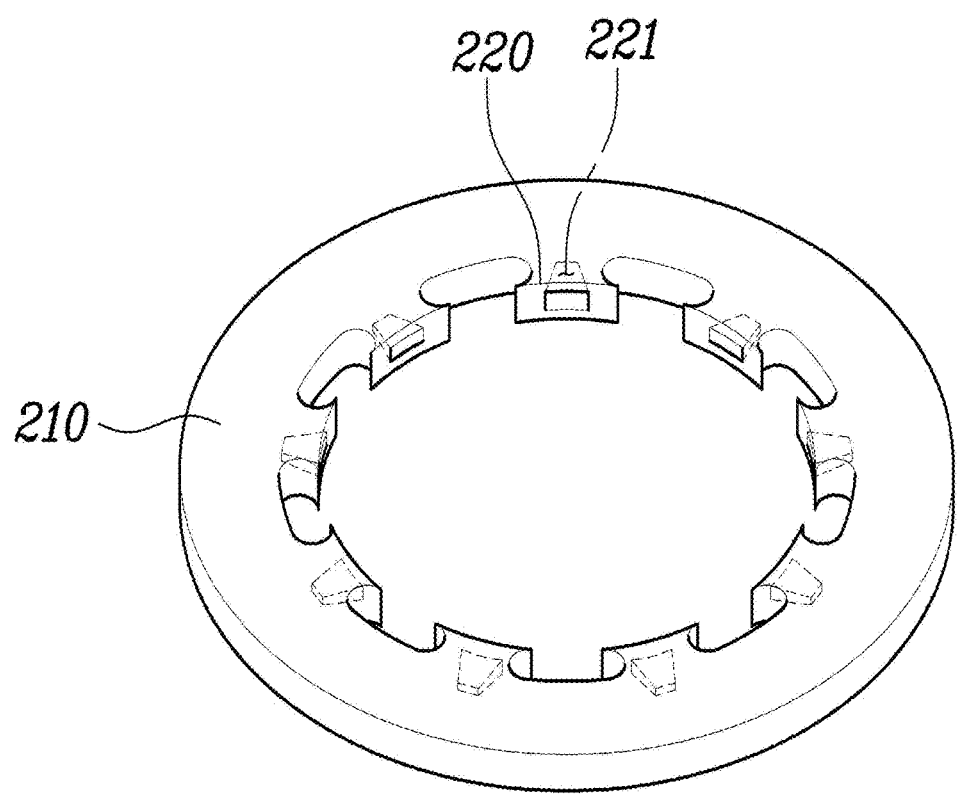
FIG. 5 is a view illustrating a friction part according to the exemplary embodiment of the present invention.

The friction part 200 is the portion that creates mechanical friction for braking as illustrated in FIG. 5. The ring body 210 of the friction part 200 is formed in the shape of a ring having the through-hole 211 formed in the center thereof, such that the hat part 100 is received in the through-hole 211. The multiple recessed portions 220, which correspond to the protrusions 120 in terms of the number and position thereof, protrude from the periphery of the through-hole 211 in the circumferential direction. The recessed portions 220 of the friction part 200 are the portions that are to be directly coupled to the protrusions 120 for the coupling between the hat part 100 and the friction part 200.

Each recessed portion 220 is coupled to a corresponding one of the protrusions 120 to enclose the protrusion 120. The recessed portion 220 defines an inside space 221 therein and the inside space 221 is filled with the protrusion 120, so that the protrusion 120 and the recessed portion 220 are in contact with each other.

The friction part 200 may be formed of gray cast iron (flake graphite cast iron), which has heat-resistance and wear-resistance and has the same coefficient of thermal expansion as spheroidal graphite cast iron.

The friction part 200 is of a solid type which has no vent hole for heat dissipation. In the case of a conventional solid-type brake disc, the hat part 100 and the friction part 200 are integrally or monolithically formed with each other, whereby thermal and torque loads are applied to a rear wheel, which is smaller than a front wheel. In the instant case, there is also a dimensional limitation due to the properties of such an integrated configuration.

The solid-type brake disc according to an exemplary embodiment of the present invention may endure torque load because the hat part 100 and the friction part 200, which are formed of different materials, are formed separately and coupled to each other, and owing to the strong coupling of the protrusions 120 and the recessed portions 220, the hat part 100 and the friction part 200 realize stabilized coupling therebetween. In addition, with the properties of the configuration in which the hat part 100 and the friction part 200 are formed separately and coupled to each other, the solid-type brake disc according to an exemplary embodiment of the present invention may overcome a dimensional limitation. This enables the weights of various elements to be reduced.

As illustrated in FIG. 2, each recessed portion 220 may come into contact at the end portion thereof with the outside surface 111 of the main body 110, and may have the inside space 221 configured to enclose the corresponding protrusion 120.

In the solid-type brake disc according to an exemplary embodiment of the present invention, as mentioned above, the hat part 100 and the friction part 200 may be stably coupled to each other via the strong coupling between the protrusions 120 formed on the hat part 100 and the recessed portions 220 formed on the friction part 200. Because each recessed portion 220 receives the corresponding protrusion 120 in the inside space 221 thereof and the end portion of the recessed portion 220 is connected to and is in contact with the outside surface 111 of the main body 110, the coupling force between the hat part 100 and the friction part 200 may be increased.

As illustrated in FIG. 2, the protrusion 120 is divided into a first protruding body 121, which protrudes from the outside surface 111 of the main body 110 and is shaped to be gradually reduced in thickness with decreasing distance to the end portion thereof in the axial direction, and a second protruding body 122, which extends outward from the first protruding body 121 and is shaped to be gradually increased in thickness with decreasing distance to the end portion thereof. Accordingly, the protrusion 120 may be the thinnest at the boundary between the first protruding body 121 and the second protruding body 122.

Here, the term "thickness" may mean the distance from one side end portion to the other side end portion in the axial direction.

The first protruding body 121 of the protrusion 120 is the portion that protrudes from the outside surface 111 of the main body 110, and may be shaped to be gradually reduced in thickness with decreasing distance to the end portion thereof.

The second protruding body 122 of the protrusion 120 is the portion that extends from the first protruding body 121 in the direction in which the first protruding body 121 protrudes, and may be inserted into the inside space 221 in the recessed portion 220 to be directly coupled to the recessed portion 220. The thickness of the second protruding body 122 may be gradually increased with decreasing distance to the end portion thereof. Meanwhile, depending on the properties of the respective shapes of the first and second protruding bodies 121 and 122, the protrusion 120 may be the thinnest at the boundary between the first protruding body 121 and the second protruding body 122, which may prevent the protrusion 120 from being separated from the inside space 221 in the corresponding recessed portion 220.

As can be seen from FIG. 3, which illustrates the cross section taken along line A-A of FIG. 2, the width of the protrusion 120 may be gradually reduced with decreasing distance to the end portion of the protrusion 120.

Here, the term "width" may mean the direction perpendicular to the length in the same plane when the length is defined as the direction in which the protrusion 120 protrudes.

Because the protrusion 120 is shaped to be gradually reduced in width with decreasing distance to the end portion thereof, when casting the friction part 200 in the state in which the hat part 100 is inserted into a mold, molten metal may be poured without remaining an empty space, which enables the recessed portion 220 to be molded to firmly enclose the protrusion 120.

Figure 6:
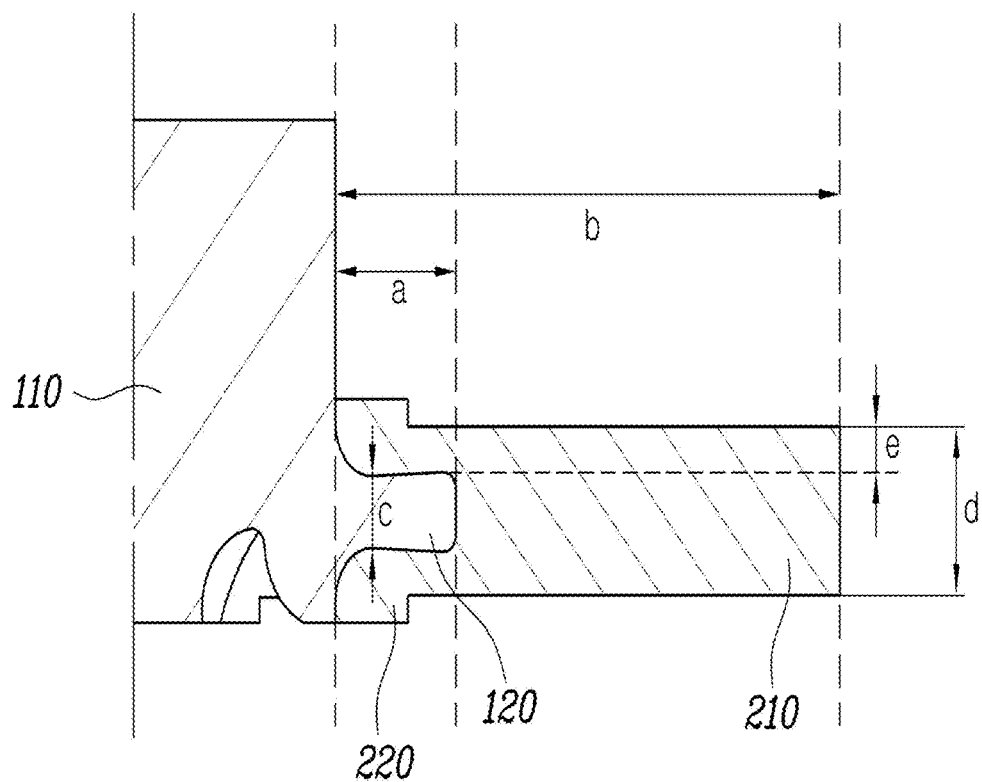
FIG. 6 is a view illustrating the cross section of the solid-type brake disc according to the exemplary embodiment of the present invention.

Referring to FIG. 6, on the basis of the radial direction, the ratio of the length that the protrusion 120 protrudes from the outside surface 111 of the main body 110 to the length from the end portion of the recessed portion 220 to the outer periphery of the ring body 210 may range from 0.18 to 0.28.

The value obtained by dividing the length "a" from the end portion of the protrusion 120 to the outside surface 111 of the main body 110 by the length "b" from the end portion of the recessed portion 220, which comes into contact with the outside surface 111 of the hat part 110, to the outer periphery of the ring body 210 may range from 0.18 to 0.2. In other words, the length from the end portion of the recessed portion 220, which comes into contact with the outside surface 111 of the hat part 110, to the outer periphery of the ring body 210 may mean the length obtained by subtracting the inside diameter of the ring body 210 from the outer diameter of the ring body 210.

When this ratio is below 0.18, the area for support when torque is applied in the rotating direction may be reduced, which may prevent effective distribution of stress. On the other hand, when this ratio exceeds 0.28, the length of the protrusion 120 is excessively greater than the inside diameter of the ring body 210, which may cause unstable vibration upon braking and may cause a load to be applied to the protrusion 120, resulting in increased maximum stress due to the nature of the structure.

Accordingly, it is reasonable for the ratio of the length that the protrusion 120 protrudes from the outside surface 111 of the main body 110 to the length from the end portion of the recessed portion 220 to the outer periphery of the ring body 210 to be controlled to fall within the range from 0.18 to 0.28.

A concrete example is illustrated in the following table 1.

TABLE 1

| Comparative Example 1 (Ratio: 0.17) | | Example (Ratio: 0.23) | | Comparative Example 2 (Ratio: 0.29) | |
|---|---|---|---|---|---|
| Hat part maximum stress | Friction part maximum stress | Hat part maximum stress | Friction part maximum stress | Hat part maximum stress | Friction part maximum stress |
| 174 Mpa | 181 Mpa | 154 MPa | 159 MPa | 175 MPa | 183 MPa |

In the case of Comparative Example 1, the ratio of the length that the protrusion 120 protrudes from the outside surface 111 of the main body 110 to the length from the end portion of the recessed portion 220 to the outer periphery of the ring body 210 is 0.17, and thus effective distribution of stress may not be achieved. Thus, it can be seen that the maximum stresses applied to the hat part 100 and the friction part 200 are respectively increased by 13% and 14% compared to Example.

In the case of Comparative Example 2, the ratio of the length that the protrusion 120 protrudes from the outside surface 111 of the main body 110 to the length from the end portion of the recessed portion 220 to the outer periphery of the ring body 210 is 0.29, and thus a load is directly applied to the protrusion 120. Thus, it can be seen that the maximum stresses applied to the hat part 100 and the friction part 200 are respectively increased by 14% and 15% compared to Example.

Referring to FIG. 6, the ratio of the thickness at the boundary between the first protruding body 121 and the second protruding body 122 to the thickness of the ring body 210 may range from 0.35 to 0.40.

The value obtained by dividing the thickness "c" at the boundary between the first protruding body 121 and the second protruding body 122 by the thickness "d" of the ring body 210 enclosing the protrusion 120 may range from 0.35 to 0.40.

When performing cast-molding, the thickness of a molded article may be at least 5 mm to realize a desired shape. When the ratio of the thickness at the boundary between the first protruding body 121 and the second protruding body 122 to the thickness of the ring body 210 is below 0.35, the thickness of the protrusion 120 may be less than a minimum thickness, thus causing casting defects. On the other hand, when the ratio of the thickness at the boundary between the first protruding body 121 and the second protruding body 122 to the thickness of the ring body 210 exceeds 0.40, a half thickness "e", which is half of the value obtained by subtracting the thickness of the protrusion 120 from the thickness of the recessed portion 220 enclosing the protrusion 120, is reduced, which makes it difficult to achieve structural rigidity to withstand a vertical load that is applied to the friction surface.

Accordingly, it is reasonable for the ratio of the thickness at the boundary between the first protruding body 121 and the second protruding body 122 to the thickness of the ring body 210 to be controlled to fall within the range from 0.35 to 0.40.

Figure 7:
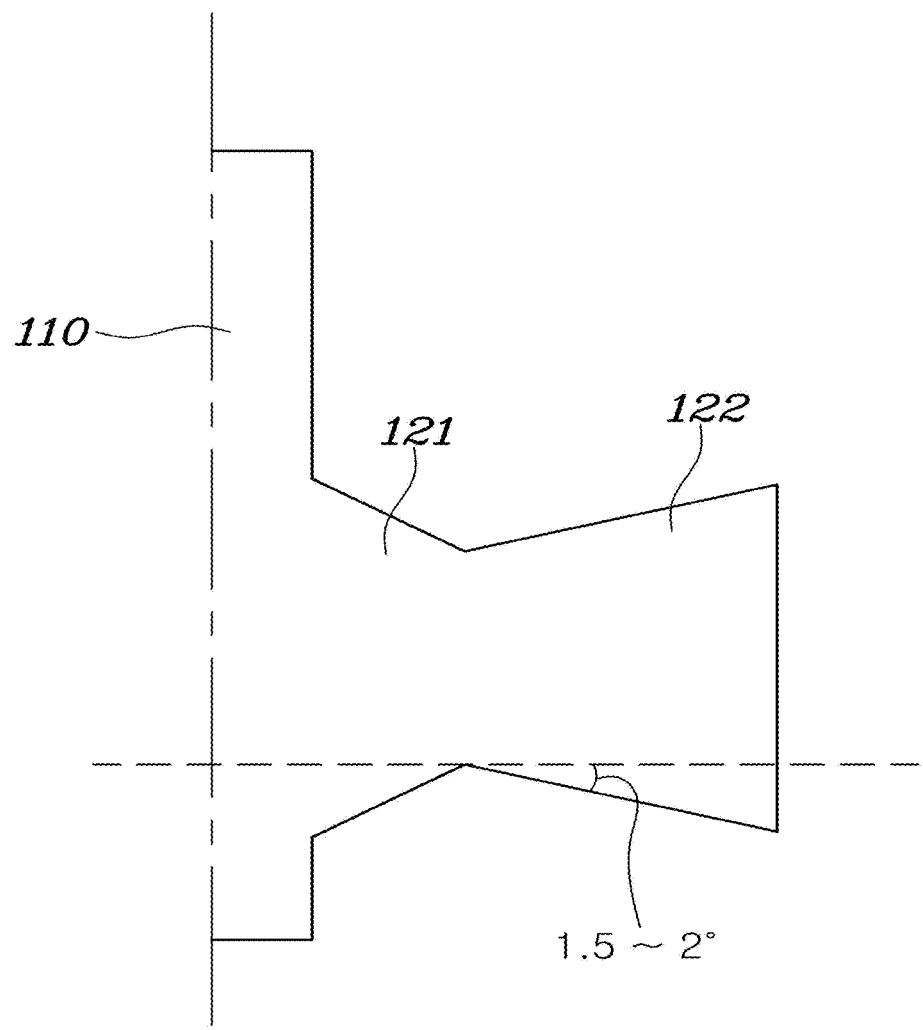
FIG. 7 is a view illustrating the shape of the side surface of a protrusion according to the exemplary embodiment of the present invention.

Referring to FIG. 7, the second protruding body 122 may have upper and lower slopes in the axial direction, and may be formed to be tilted upward and downward by an angle of 1.5 to 2 degrees relative to imaginary lines that extend in parallel to the radial direction at the upper end portion and the lower end portion of the boundary between the first protruding body 121 and the second protruding body 122.

The angle, by which the second protruding body 122 may be tilted upward and downward from the boundary between the first protruding body 121 and the second protruding body 122, may be controlled to fall within the range from 1.5 degrees to 2 degrees relative to the imaginary lines that extend in parallel to the radial direction at the upper end portion and the lower end portion of the boundary between the first protruding body 121 and the second protruding body 122.

When the protrusion 120 coupled to the recessed portion 220 is tilted upward and downward, i.e. is provided with counter slopes, with decreasing distance to the end portion thereof, expansion in the radial direction may be suppressed upon thermal expansion. Accordingly, deformation that causes vibration of elements may be suppressed.

When the half thickness "e", which is half of the value obtained by subtracting the thickness of the protrusion 120 from the thickness of the recessed portion 220 enclosing the protrusion 120, does not reach 3.5 mm, the maximum stress is rapidly reduced from approximately 186 MPa to approximately 166 MPa on the basis of the thickness of 3.5 mm.

When each of the upper and lower slopes of the protrusion 120 is below 1.5 degrees, it is difficult to anticipate the effects of counter slopes mentioned above and to realize a desired shape via casting. On the other hand, when each of the upper and lower slopes of the protrusion 120 exceeds 2 degrees, the half thickness "e", which is half of the value obtained by subtracting the thickness of the protrusion 120 from the thickness of the recessed portion 220 enclosing the protrusion 120, is 3.5 mm or less, which makes it difficult to achieve structural rigidity to withstand the vertical load applied to the friction surface. Accordingly, it is reasonable for the angle by which the second protruding body 122 is tilted upward and downward relative to the imaginary lines that extend in parallel to the radial direction at the upper end portion and the lower end portion of the boundary between the first protruding body 121 and the second protruding body 122 to be controlled to fall within the range from 1.5 degrees to 2 degrees.

A concrete example is illustrated in the following table 2.

TABLE 2

|  | Comparative Example 1 (Slope: 1°) | Example (Slope: 2°) | Comparative Example 2 (Slope: 3°) |
| --- | --- | --- | --- |
| Axial constriction thickness | 0.28 mm | 0.28 mm | 0.28 mm |
| Thickness increased by slope | 0.46 mm | 0.90 mm | 1.36 mm |
| Half thickness "e", which is half of the value obtained by subtracting thickness of protrusion from thickness of recessed portion enclosing protrusion | 3.77 mm | 3.55 mm | 3.32 mm |

The comparison of the above Example and Comparative Examples was performed under the assumption that the thickness at the boundary between the first protruding body 121 and the second protruding body 122 is 5 mm in all of the Example and the Comparative Examples.

In the case of Comparative Example 1, although the half thickness "e", which is half of the value obtained by subtracting the thickness of the protrusion 120 from the thickness of the recessed portion 220 enclosing the protrusion 120 is 3.77 mm and thus satisfies the requirement of 3.5 mm or more, it is difficult to realize this shape. In the case of Comparative Example 2, the half thickness "e", which is half of the value obtained by subtracting the thickness of the protrusion 120 from the thickness of the recessed portion 220 enclosing the protrusion 120, has the value of 3.5 mm or less, and thus it is difficult to achieve structural rigidity to withstand the vertical load that is applied to the friction surface.

A plurality of bridges, which are formed by the protrusions 120 and the recessed portions 220, are spaced apart from one another by the same distance along the outside surface 111 of the main body 110 and the periphery of the through-hole 211, whereby discharge holes 10 may be formed between the bridges. The number of bridges may be nine.

The mode of the brake disc depends on the correlation of the judder phenomenon, which is vibration of the brake during braking, and the hot spot phenomenon. Among the modes of the brake disc, when an out-of-plane bending mode (along the axial direction) is applied, hot spots may overlap each other. In the instant case, the hot spot phenomenon may easily occur.

The number of bridges formed via the coupling of the protrusions 120 and the recessed portions 220 may advantageously be an odd number to avoid overlapping. When the number of bridges is seven, the structural rigidity may be deteriorated. When the number of bridges is eleven, the overall weight may be increased, and thus it is difficult to achieve a lightweight configuration. Accordingly, the number of bridges may be nine.

Figure 8:
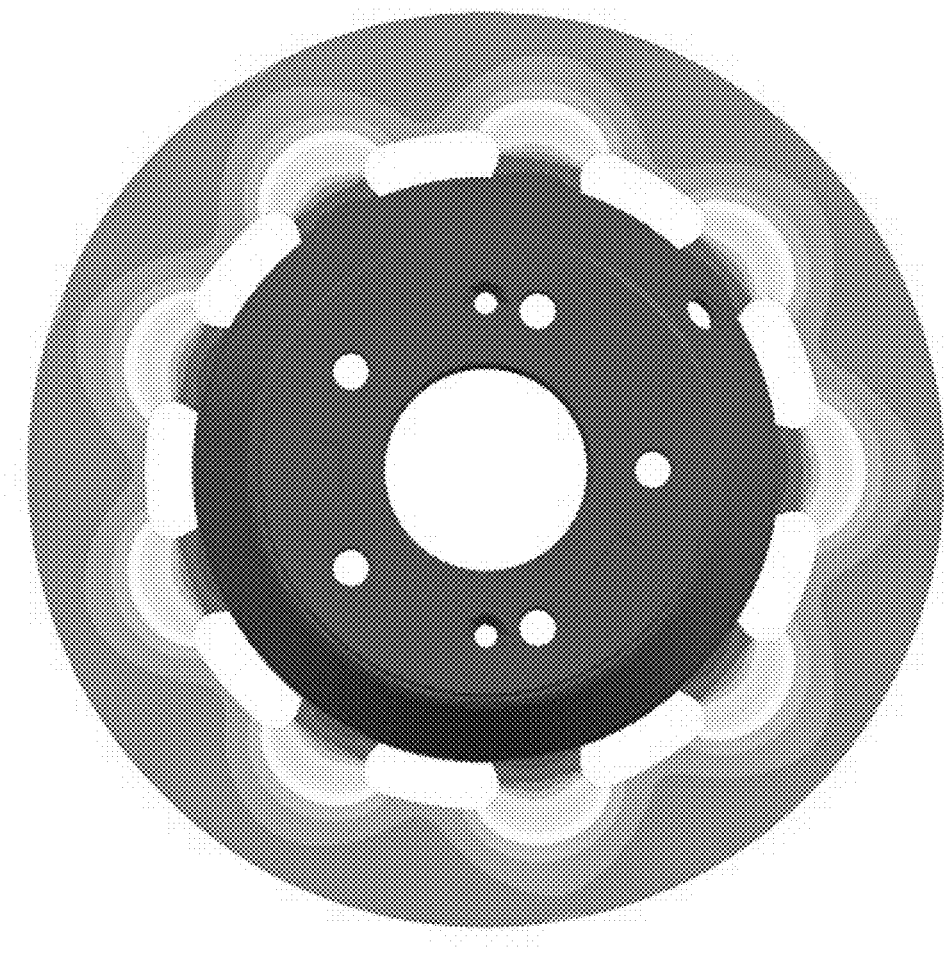
FIG. 8 is a view illustrating hot spots in a thermal distribution for the solid-type brake disc according to the exemplary embodiment of the present invention.
Figure 9A:
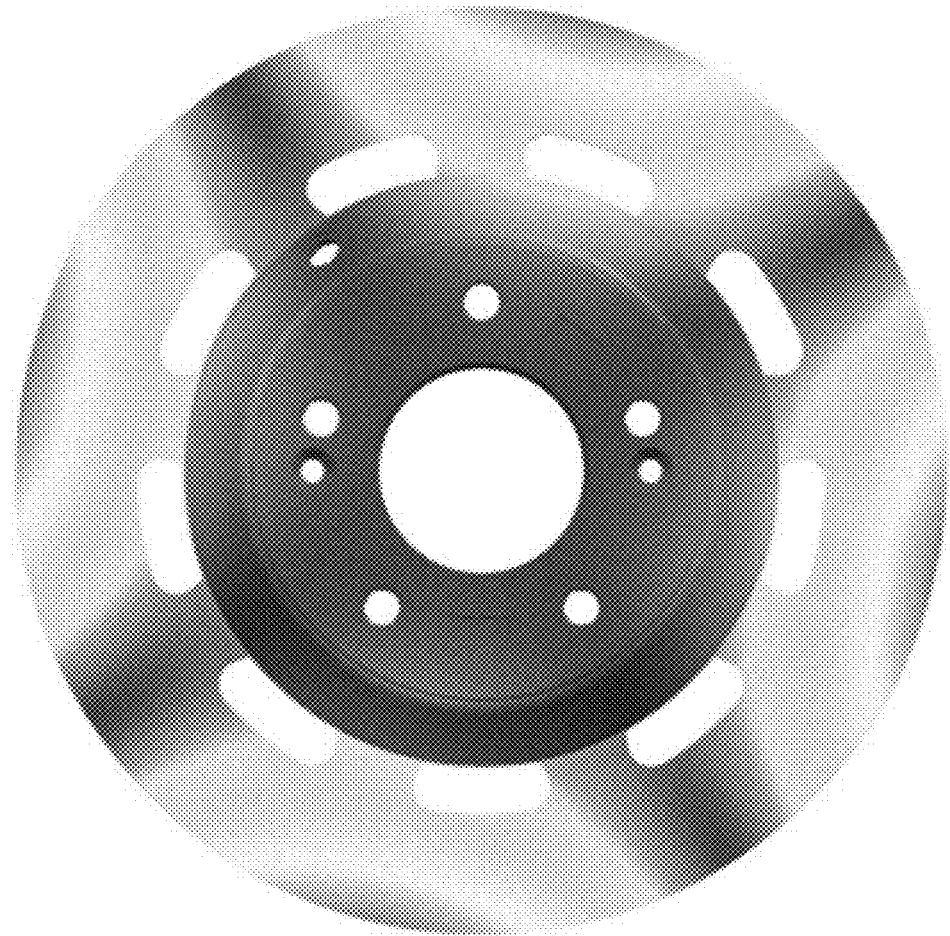
FIG. 9A, FIG. 9B, FIG. 9C, FIG. 9D, and FIG. 9E are views illustrating an out-of-plane bending mode (along the axial direction) among the results of frequency response analysis conducted on the solid-type brake disc according to the exemplary embodiment of the present invention.
Figure 9B:
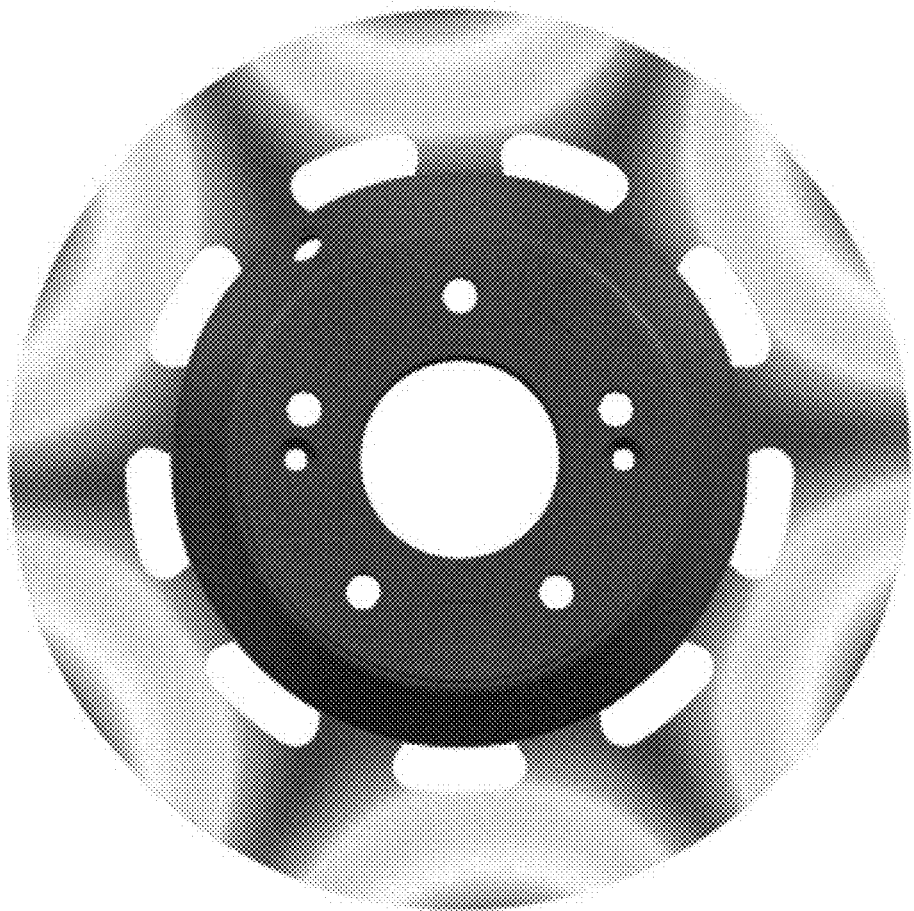
Figure 9C:
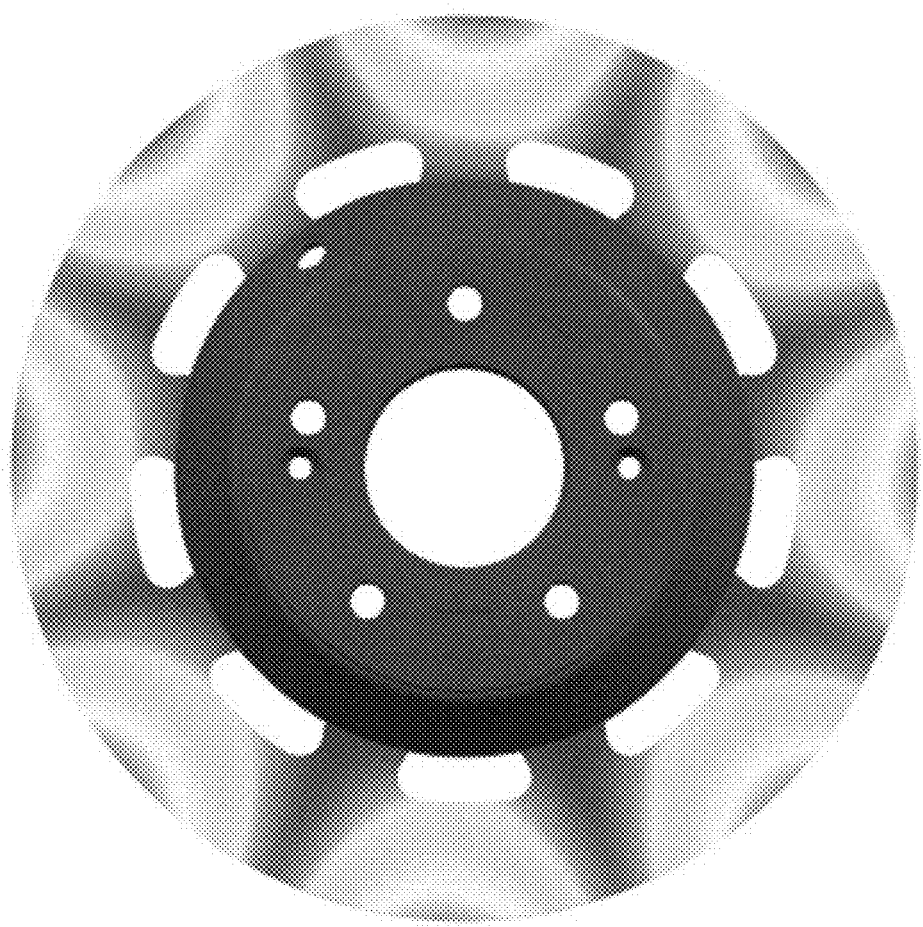
Figure 9D:
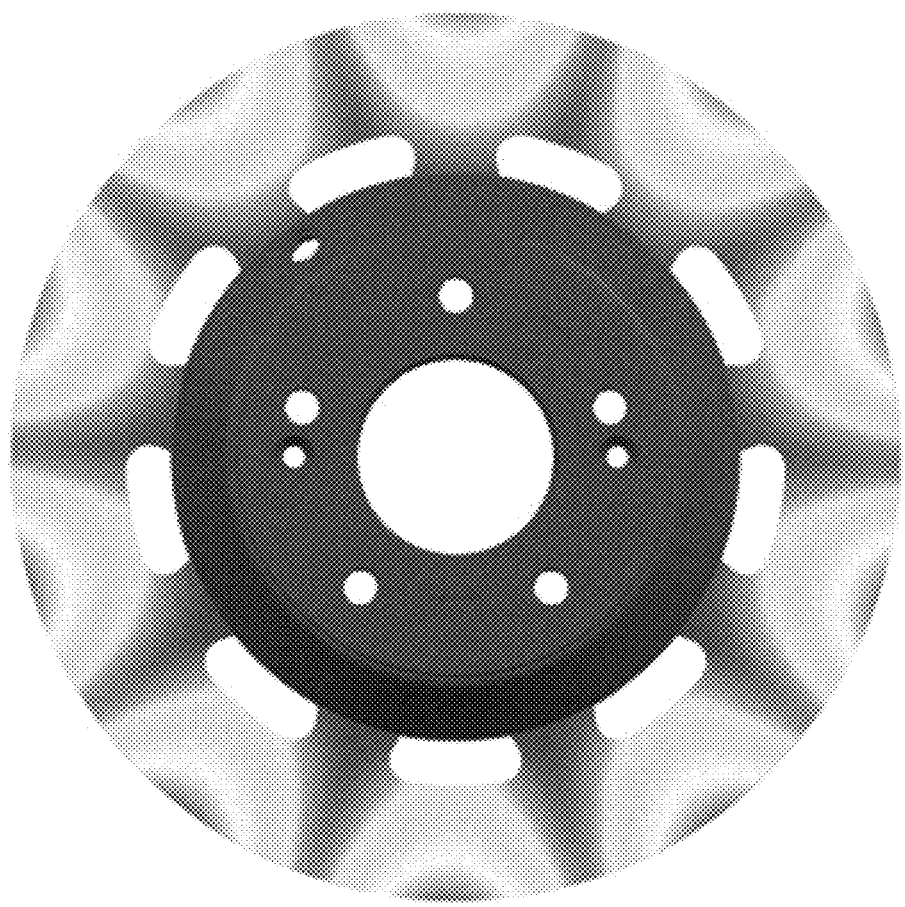
Figure 9E:
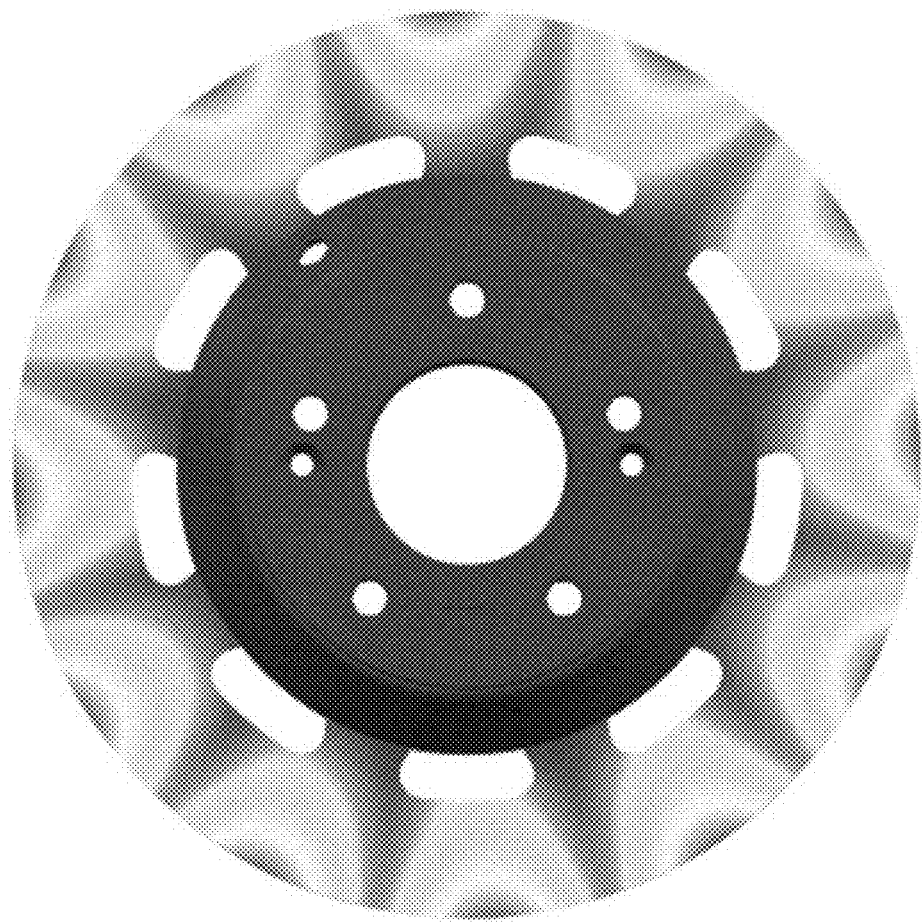

When performing heat transfer analysis of the structure of a brake disc in which the number of bridges is nine, the thermal distribution illustrated in FIG. 8 results, and nine hot spots are generated.

Among the results of frequency response analysis of the brake disc, the out-of-plane bending mode (along the axial direction) may appear as illustrated in FIGS. 9A-9E, and the number of hot spots that may be generated at this time are four, six, eight, ten, or twelve, and are found not to overlap with nine hot spots as the result of heat transfer analysis, which enables alleviation of the generation of the judder phenomenon.

A method of manufacturing the solid-type brake disc according to an exemplary embodiment of the present invention includes a first cast-molding step of molding the hat part 100, which includes the circular main body 110 mounted on the rotation shaft of the wheel and the protrusions 120 protruding from the outside surface 111 of the main body 110 in the circumferential direction, an inserting step of inserting the hat part 100 into a mold, and a second cast-molding step of molding the friction part 200, which includes the ring body 210 having the through-hole 211 in the center thereof for receiving the hat part 100 in the through-hole 211 and the recessed portions 220 protruding from the periphery of the through-hole 211 toward the protrusions 120, the recessed portions 220 being connected to the protrusions 120 to enclose the protrusions 120.

The first molding step may be performed in a sand casting manner. The protrusions 120 may be processed in an as-cast condition without separate processing.

The hat part 100 may be pre-heated before the inserting step. At this time, the preheat temperature may be 450±50° C. This preheating is performed to improve the flowability of molten metal in the protrusions 120 upon differential casting.

In the first molding step and the second molding step, cast iron is used for the casting of the hat part 100 and the friction part 200. The strength of the cast iron used to cast the hat part 100 may be higher than the strength of the cast iron used to cast the friction part 200.

In the case of the hat part 100, spheroidal graphite cast iron at a level of 400 MPa or more may be used. In the case of the friction part 200, gray graphite cast iron at a level of 200 MPa or more may be used.

As is apparent from the above description, in a solid-type brake disc according to an exemplary embodiment of the present invention, a hat part and a friction part are formed separately and coupled to each other, achieving stabilized coupling therebetween owing to strong coupling between protrusions and recessed portions.

In this way, the solid-type brake disc may endure torque load, and may overcome a dimensional limitation caused by the properties of the configuration in which the hat part and the friction part are formed separately. This may allow the weights of elements to be reduced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A solid-type brake disc comprising:
  a hat part including a circular main body mounted on a rotation shaft of a wheel, and a plurality of protrusions protruding in a circumferential direction from an outside surface of the main body; and
  a friction part including a ring body having a through-opening formed in a center thereof for receiving the hat part in the through-opening, and recessed portions protruding from a periphery of the through-opening toward the respective protrusions, the recessed portions being connected to the respective protrusions to enclose the protrusions,
  wherein a ratio of a length that each protrusion protrudes from the outside surface of the main body in a radial direction to a length from an end portion of each recessed portion to an outer periphery of the ring body ranges from 0.18 to 0.28.

2. The brake disc according to claim 1, wherein each of the recessed portions has an end portion in contact with the outside surface of the main body, and is provided with an inside space for enclosing a corresponding one of the protrusions.

3. The brake disc according to claim 1, wherein each of the protrusions is divided into a first protruding body, which protrudes from the outside surface of the main body and is shaped to be reduced in thickness with decreasing distance to an end portion thereof in an axial direction, and a second protruding body, which extends outward from the first protruding body and is shaped to be increased in thickness with decreasing distance to an end portion thereof, wherein the protrusion is thinnest at a boundary between the first protruding body and the second protruding body.

4. The brake disc according to claim 1, wherein each of the protrusions is shaped to be reduced in width with decreasing distance to an end portion thereof.

5. The brake disc according to claim 3, wherein a ratio of a thickness at a boundary between the first protruding body and the second protruding body to a thickness of the ring body ranges from 0.35 to 0.40.

6. The brake disc according to claim 3, wherein the second protruding body has upper and lower slopes in an axial direction, and is formed to be tilted upward and downward by an angle of 1.5 to 2 degrees relative to imaginary lines that extend in parallel to a radial direction at an upper end portion and a lower end portion of a boundary between the first protruding body and the second protruding body.

7. The brake disc according to claim 1, wherein the protrusions and the recessed portions form a plurality of bridges, which are spaced apart from one another by a same distance along an outside surface of the main body and a periphery of the through-opening to form discharge openings between the bridges.

8. The brake disc according to claim 7, wherein a number of bridges is nine.

9. A method of manufacturing a solid-type brake disc, the method comprising:
  cast-molding a hat part, which includes a circular main body mounted on a rotation shaft of a wheel and a plurality of protrusions protruding from an outside surface of the main body in a circumferential direction;
  inserting the hat part into a mold; and
  cast-molding a friction part, which includes a ring body having a through-opening in a center thereof for receiving the hat part in the through-opening and recessed portions protruding from a periphery of the through-opening toward the respective protrusions, the recessed portions being connected to the respective protrusions to enclose the protrusions, via casting, wherein a ratio of a length that each protrusion protrudes from the outside surface of the main body in a radial direction to a length from an end portion of each recessed portion to an outer periphery of the ring body ranges from 0.18 to 0.28.

10. The method according to claim 9, wherein, in the cast-molding the hat part and the cast-molding the friction part, cast iron is used to cast the hat part and the friction part, and a strength of the cast iron used to cast the hat part is higher than a strength of the cast iron used to cast the friction part.

\* \* \* \* \*